Feb. 25, 1947.    H. W. TREVASKIS    2,416,657
HOSE COUPLING
Filed Jan. 17, 1945
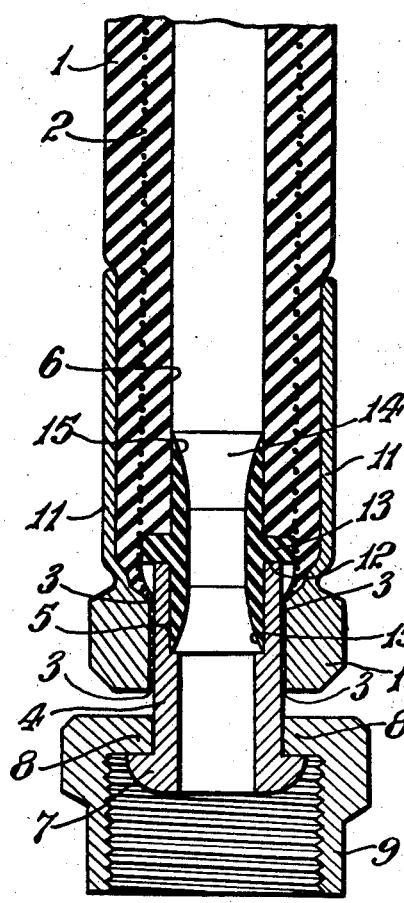
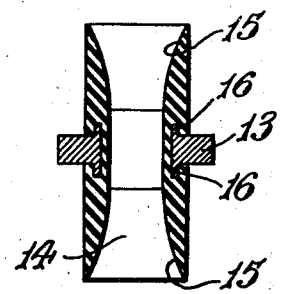
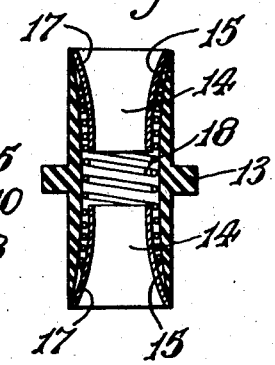
Inventor
Henry William Trevaskis
by Benj. T. Rauber
his attorney Patented Feb. 25, 1947

2,416,657

UNITED STATES PATENT OFFICE 2,416,657

HOSE COUPLING

Henry William Trevaskis, Solihull, Birmingham, England, assignor to Dunlop Rubber Company Limited, London County, England, a British company Application January 17, 1945, Serial No. 573,161
In Great Britain February 29, 1944

6 Claims. (Cl. 285—84)

My invention concerns improvements in coupling units for hose composed of rubber or synthetic rubber-like material having an imbedded or external reinforcing layer of inextensible material such as braided wire or the like.

The invention has for its object to provide a leak-proof hose coupling unit capable of withstanding the bursting pressure of the hose and which remains unaffected by vibration when installed on aircraft and in other positions subject to much vibration.

According to this invention we provide a hose coupling unit comprising a sleeve, a tubular insert, a sealing tube of resilient material and a flexible hose of the type comprising an inner layer of rubber or the like and a layer of reinforcing material wherein the said sealing tube overlaps the adjacent ends of the insert and of that portion of the hose within said reinforcing layer said ends abutting the opposite sides of a flange projecting from said tube and said tube having tapered end portions contacting with the bore of the insert and of the hose. The flange may consist of a metal ring having at its inner periphery a fin extending axially therefrom and imbedded in the said sealing tube. The tapered end portions of the sealing tube may be each fitted externally with a bell mouthed metal member, said members being connected by a tension spring adapted to expand said end portions diametrically within the ends of the hose and insert.

In order that the invention may be more clearly understood and readily carried into practical effect reference is made, in further describing the same, to the accompanying drawing in which—

Fig. 1 is a sectional view of a hose coupling unit constructed in accordance with the invention.

Fig. 2 is a sectional view of one form of sealing tube for use with the improved hose coupling unit.

Fig. 3 is a sectional view of another form of sealing tube for use with the improved hose coupling unit.

A convenient embodiment of a coupling unit constructed in accordance with the invention includes a hose 1 composed of rubber or synthetic rubber like material having a reinforcing layer 2 of braided wire of high tensile strength which may be lined with canvas, said layer being imbedded in or forming the outer surface of the hose. The rubber at the end of the hose is removed from the reinforcing layer so as to bare a portion 3 of the reinforcing layer. The bared portion 3 of the reinforcing layer is clamped to the outer surface of a tubular metal insert 4 of which the bore 5 at the inner end of the insert adjacent the end of the hose is enlarged to a diameter corresponding substantially to the diameter of the bore 6 of the hose. The insert 4 is formed at its outer end with an external shoulder 7 constituting a flange adapted to be engaged as by an internal flange 8 formed on a nut 9 which may be threaded internally for attachment to the threaded end of a pipe or like union. The bared portion 3 of the reinforcing layer is clamped in direct contact with the insert by the compression of a ring or collar 10 of deformable metal having an integral sleeve 11 embracing the surface of the hose and extending beyond the insert and the end of the hose fitted thereto.

The reinforcing layer is clamped to the insert so that the inner end 12 of the insert and the end of the rubber hose portion within the inextensible layer 2 abut the opposite sides of an annular flange 13 of rectangular section extending radially from the central part of a sealing tube 14 of resilient material such as rubber or rubber-like material. The outer diameter of the sealing tube on one side of the annular projection corresponds to the enlarged diameter portion of the insert and on the other side of the annular projection to the bore of the hose.

The internal diameter of the sealing tube at its central part is of reduced diameter relative to the bore of the insert and increases gradually in internal diameter towards each end of said tube thus forming two tapered end portions 15 constituting flexible sealing parts expansible by fluid under pressure into self-sealing contact with the insert and the hose respectively.

In the modification shown in Fig. 2 the annular flange 13 contacted by the adjacent ends of the insert and of the hose consists of a metal ring of rectangular section merging on each side at its inner periphery into an axially extending fin 16 adapted to provide a seating to which the sealing tube is keyed during moulding and vulcanisation.

In a further modification shown in Fig. 3 each tapered end 15 of the sealing tube 14 is provided with a bell mouthed metal member in the form of a thin flared metal cone 17 the enlarged ends of which members bear upon the tapered ends of the sealing tube. The members 17 are axially pulled together by a tension coil spring 18 the end coils of which are secured to said members whereby their flared ends are caused to expand and compress the tapered ends of the sealing tube into sealing contact with the insert and with the bore of the hose.

Having described my invention, what I claim is:

1. A hose coupling which comprises a hose having an inner layer of rubber composition and a layer of reinforcing material embedded therein, said reinforcing material projecting beyond the end of said layer of rubber composition, a tubular insert extending within said projecting reinforcing material, an outer sleeve over the end of said hose and compressed onto the projecting reinforcing material about said tubular insert to grip said reinforcing material on said tubular insert and a sealing tube within, and overlapping the adjacent ends of, said tubular insert and said inner layer of rubber composition.

2. A hose coupling which comprises a hose having an inner layer of rubber composition and a layer of reinforcing material embedded therein, said reinforcing material projecting beyond the end of said inner layer of rubber composition, a tubular insert extending within said projecting reinforcing material, an outer sleeve encircling the projecting reinforcing material and compressed inwardly to grip said projecting reinforcing material onto said tubular insert and a sealing tube within, and overlapping the adjacent ends of, said tubular insert and said layer of rubber composition and having a flange projecting between the opposed ends of said tubular insert and said inner layer of rubber composition.

3. The coupling of claim 2 in which said flange is a metal flange embedded in said sealing tube.

4. The coupling of claim 1 in which the inner surface of said tubular insert is in substantial alignment with the inner surface of said inner layer of said rubber composition.

5. The coupling of claim 1 in which the opposite ends of said sealing tube are bevelled to the inner surfaces of said inner layer and said tubular insert.

6. A hose coupling which comprises a hose having an inner layer of rubber composition and a layer of reinforcing material embedded therein, said reinforcing material projecting beyond the end of said layer of rubber composition, a tubular insert extending within said projecting reinforcing material toward the end of said inner layer of rubber composition, an outer sleeve encircling the end of said hose and compressed onto the projecting reinforcing material to clamp said material onto said tubular insert, a sealing tube within, and overlapping the adjacent ends of, said tubular insert and said rubber composition and having an outer flange projecting between the opposed ends of said tubular insert and said layer of rubber composition, the opposite ends of said sealing tube being bevelled toward the inner surface of said inner layer and of said tubular insert, and a pair of flared metal cones covering the flared ends of said sealing tube and means to hold said cones resiliently onto said beveled ends of said sealing tube.

HENRY WILLIAM TREVASKIS.

REFERENCES CITED

The following references are of record in the file of this patent:

UNITED STATES PATENTS

| Number | Name | Date |
|---|---|---|
| 590,258 | Dale | Sept. 21, 1897 |
| 795,796 | Gottwald | July 25, 1905 |

FOREIGN PATENTS

| Number | Country | Date |
|---|---|---|
| 556,385 | British | Oct. 1, 1943 |